(12) United States Patent
Lin et al.

(10) Patent No.: US 9,436,026 B2
(45) Date of Patent: Sep. 6, 2016

(54) DISPLAY DEVICE

(71) Applicant: AmTRAN TECHNOLOGY CO., LTD, New Taipei (TW)

(72) Inventors: Huang-Pin Lin, New Taipei (TW); Jui-Chuan Chien, New Taipei (TW)

(73) Assignee: AMTRAN TECHNOLOGY CO., LTD, New Taipei (TW)

( * ) Notice: Subject to any disclaimer, the term of this patent is extended or adjusted under 35 U.S.C. 154(b) by 194 days.

(21) Appl. No.: 13/913,645

(22) Filed: Jun. 10, 2013

(65) Prior Publication Data

US 2014/0307196 A1 Oct. 16, 2014

(30) Foreign Application Priority Data

Apr. 10, 2013 (TW) .............................. 102112764 A (51) Int. Cl.
*G02F 1/133* (2006.01)
*G02F 1/1333* (2006.01)

(52) U.S. Cl.
CPC .................. *G02F 1/133308* (2013.01); *G02F 2001/13332* (2013.01); *G02F 2001/133314* (2013.01); *G02F 2201/46* (2013.01)

(58) Field of Classification Search
CPC .................... G02F 2201/46; G02F 2201/465; G02F 1/133308; G02F 1/13332; G02F 2001/13332; G02F 2201/45; G02F 2001/133314; G02F 2001/1333
USPC .......................................................... 349/58
See application file for complete search history.

(56) References Cited

U.S. PATENT DOCUMENTS

| | | | |
|---|---|---|---|
| 2006/0207145 A1* | 9/2006 | Kim | G02F 1/133308 40/700 |
| 2011/0149194 A1* | 6/2011 | Nakano | 349/58 |
| 2012/0257122 A1* | 10/2012 | Suzuki | G02B 6/0088 348/794 |

* cited by examiner

Primary Examiner — Jessica M Merlin
(74) Attorney, Agent, or Firm — Maschoff Brennan (57) ABSTRACT

A display device includes a display module, an assembly holder and a front case. The display module has a front surface, a rear surface, a side surface, and a display area. The front surface and the rear surface are located at two opposite sides of the display module. The side surface connects between the front surface and the rear surface. The display area is located at the front surface. The assembly holder includes a joint portion and a first withstanding portion. The joint portion is arranged on the side surface. The first withstanding portion is connected to the joint portion. The front case includes a first plate member, a second plate member, and a second withstanding portion. The first plate member is connected to the second plate member. The second withstanding portion is located on the first plate member and has a groove.

9 Claims, 8 Drawing Sheets

DISPLAY DEVICE

This non-provisional application claims priority under 35 U.S.C. §119(a) on Patent Application No(s). 102112764 filed in Taiwan, R.O.C. on Apr. 10, 2013, the entire contents of which are hereby incorporated by reference.

BACKGROUND

1. Technical Field

The disclosure relates to a display device, more particularly to a display device for improving assembly reliability.

2. Related Art

A Liquid Crystal Display (LCD) has advantages of high definition, small volume, light weight, low voltage drive, and low power consumption, and therefore can be widely applied to electronic products such as portable televisions, mobile phones, camcorders, notebook computers, desktop computers, and televisions.

For example, a television comprises a display module and a case. The display module generally comprises an iron frame and a display panel. The iron frame wraps the display panel, and exposes a display area of the display panel. The case covers the iron frame of the display module, and exposes the display area of the display panel. The case covers the iron frame, hence avoiding exposing the iron frame and avoiding affecting the aesthetic design of the television.

However, nowadays, as televisions are getting bigger in size, the display module inside the television is becoming heavier. Therefore, after the case and the iron frame are assembled, if the material strength of the case is incapable of bearing the weight of the display module, the case may be squeezed and deformed. The deformed case may expose the iron frame, and therefore negatively affects the aesthetic design of the television.

SUMMARY

A display device comprises a display module, an assembly holder and a front case. The display module has a front surface, a rear surface, a side surface, and a display area. The front surface and the rear surface are located at two opposite sides of the display module. The side surfaces are located between the front surface and the rear surface. The display area is located at the front surface. The assembly holder comprises a joint portion and a first withstanding portion. The joint portion is arranged on the side surface. The first withstanding portion is connected to the joint portion. The front case comprises a first plate member, a second plate member, and a second withstanding portion. The first plate member is connected to the second plate member. The second withstanding portion is located on the first plate member and has a groove. The front case is arranged at the display module. The first plate member covers the side surface. The second plate member covers the front surface and exposes at least a portion of the display area. The first withstanding portion and the second withstanding portion abut against each other along a direction perpendicular to the side surface.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
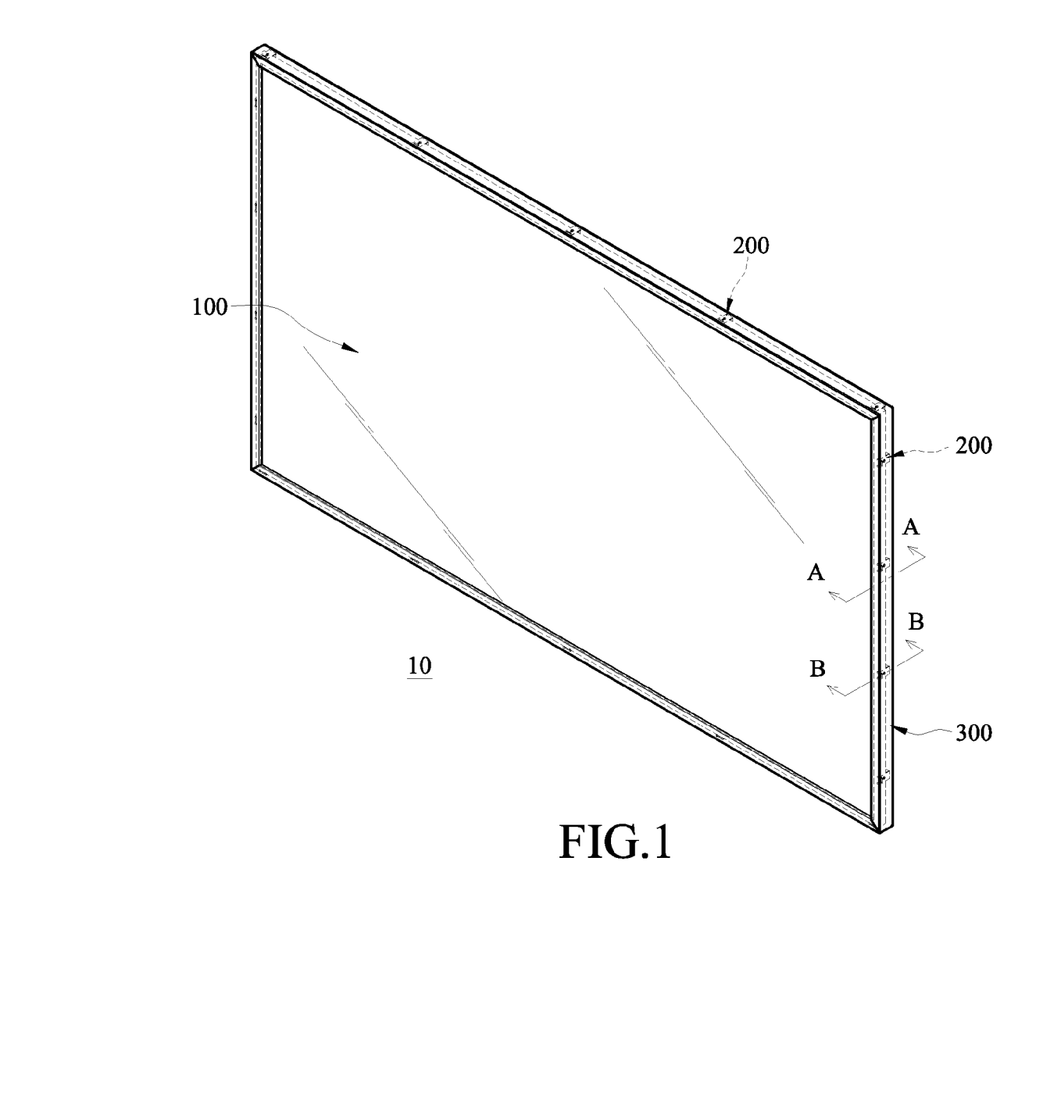
FIG. 1 is a perspective view of a display device according to a first embodiment of the disclosure.
Figure 2:
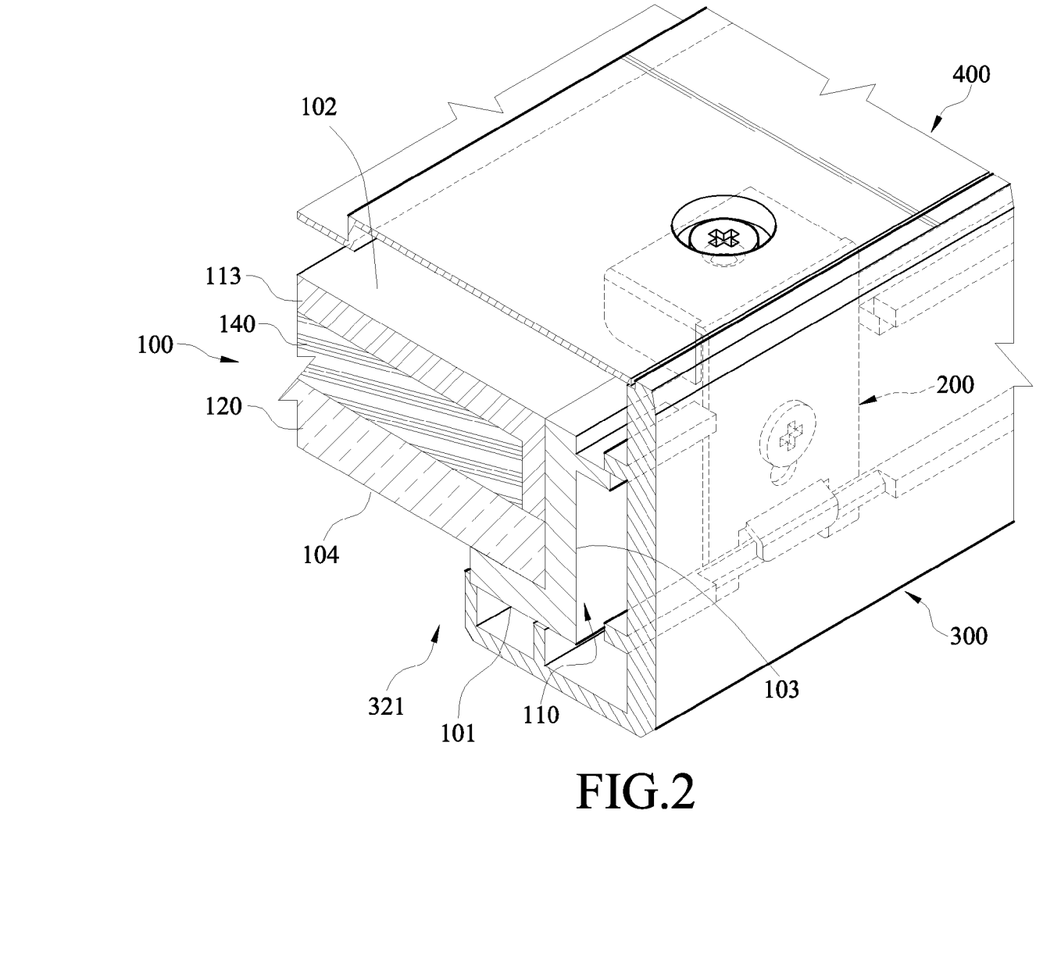
FIG. 2 is a sectional view taken along a section line AA in FIG. 1.
Figure 3:
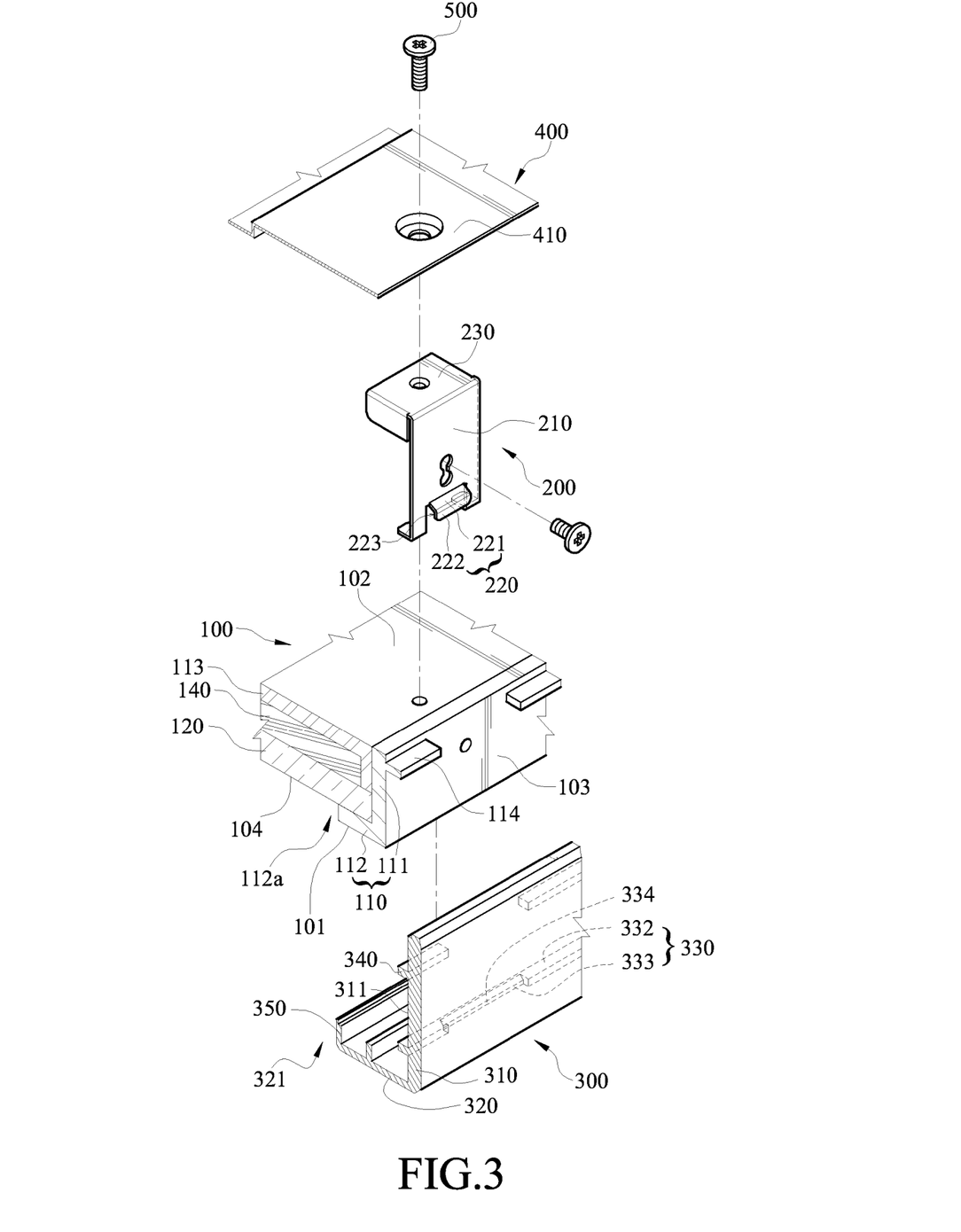
FIG. 3 is an exploded view of components in FIG. 2.
Figure 4:
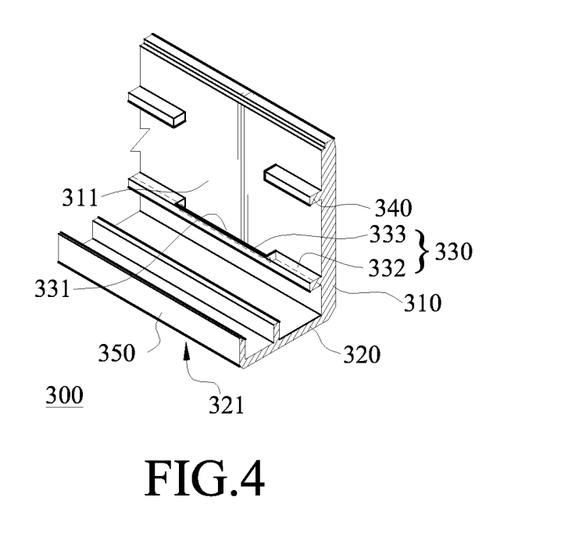
FIG. 4 is a perspective view of a front case of FIG. 3.

Referring to FIG. 1 to FIG. 4, FIG. 1 is a perspective view of a display device according to a first embodiment of the disclosure; FIG. 2 is a perspective sectional view taken along a section line AA in FIG. 1; FIG. 3 is an exploded schematic view of components in FIG. 2; and FIG. 4 is a perspective view of a front case of FIG. 3.

As seen in FIG. 1 and FIG. 2, a display device 10 of the embodiment comprises a display module 100, a plurality of assembly holders 200, a front case 300, and a rear case 400 (as shown in FIG. 2). The display module 100 of the embodiment has a plurality of assembly holders 200, but the disclosure is not limited thereto. In some embodiments, only one assembly holder 200 is used.

As seen in FIG. 2, the display module 100 has a front surface 101, a rear surface 102, a side surface 103, and a display area 104. The front surface 101 and the rear surface 102 are located at two opposite sides of the display module 100. The side surface 103 is connected between the front surface 101 and the rear surface 102. The display area 104 is close to the front surface 101. Furthermore, the display module 100 comprises a back plate 113, an optical film 140, an outer frame 110, and a display panel 120. The display area 104 is an area on the display panel 120 for displaying an image.

As seen in FIG. 3, the outer frame 110 comprises a first side plate 111 having a side surface 103 and a second side plate 112 having a front surface 101. Two opposite sides of the first side plate 111 are connected to the second side plate 112 and the back plate 113, and the second side plate 112 has an opening 112a. The display panel 120 is disposed between the second side plate 112 and the back plate 113. The opening 112a exposes the display area 104. The optical film 140 is disposed between the back plate 113 and the display panel 120.

As shown in FIG. 3, the outer frame 110 further comprises a first fastening portion 114. The first fastening portion 114 is located on an outer wall (namely, the side surface 103) of the first side plate 111. In this embodiment, the first fastening portion 114 is a bump, but the disclosure is not limited thereto.

In FIG. 3, the assembly holder 200 comprises a joint portion 210, a first withstanding portion 220, and a second fixing portion 230. The joint portion 210 is disposed on the side surface 103. The first withstanding portion 220 comprises a connection section 221 and a withstanding section 222. The connection section 221 is connected to the joint portion 210. The withstanding section 222 extends towards the normal of the front surface 101 from the connection section 221. The withstanding section 222 has a first adjoining face 223 facing the side surface 103. The first adjoining face 223 keeps a distance from the side surface 103. The first withstanding portion 220 is closer to the front surface 101 than the first fastening portion 114. The second fixing portion 230 is connected to the joint portion 210 and covers the rear surface 102 of the display module 100.

As shown in FIG. 3 and FIG. 4, the front case 300 comprises a first plate member 310, a second plate member 320, and a second withstanding portion 330. The first plate member 310 has an inner wall 311. The second plate member 320 is connected at the inner wall 311 of the first plate member 310. The second plate member 320 has an opening 321. The second withstanding portion 330 is connected at the inner wall 311 of the first plate member 310. The second withstanding portion 330 has a groove 331. Specifically, the second withstanding portion 330 comprises two support sections 332 and a prop section 333. The two support sections 332 extend towards the side surface 103 from the inner wall 311 of the first plate member 310. The prop section 333 connects the two support sections 332, hence forming the groove 331. The prop section 333 has a second adjoining face 334 forming the groove 331. The second adjoining face 334 faces the inner wall 311. After the display device 10 is assembled, the withstanding section 222 is located in the groove 331, and the first adjoining face 223 of the withstanding section 222 abuts against the second adjoining face 334 of the prop section 333 (as shown in FIG. 2). The first withstanding portion 220 and the second withstanding portion 330 abut against each other along a direction perpendicular to the side surface 103.

In addition, the front case 300 further comprises a second fastening portion 340. The second fastening portion 340 is connected at the inner wall 311 of the first plate member 310, and the first fastening portion 114 buckles the second fastening portion 340, so that the front case 300 is incapable of moving towards the front surface 101. The second fastening portion 340 in this embodiment is a bump.

The front case 300 further comprises a third plate member 350. The third plate member 350 is connected to the second plate member 320. The first plate member 310 and the third plate member 350 are located at two ends of the second plate member 320 and extend out towards the same side. The rear case 400 comprises a first fixing portion 410 that corresponds to the second fixing portion 230. A locking member 500 runs through the first fixing portion 410 of the rear case 400 and the second fixing portion 230 of the assembly holder 200, so that the rear case 400 is located at the display module 100.

Figure 5:
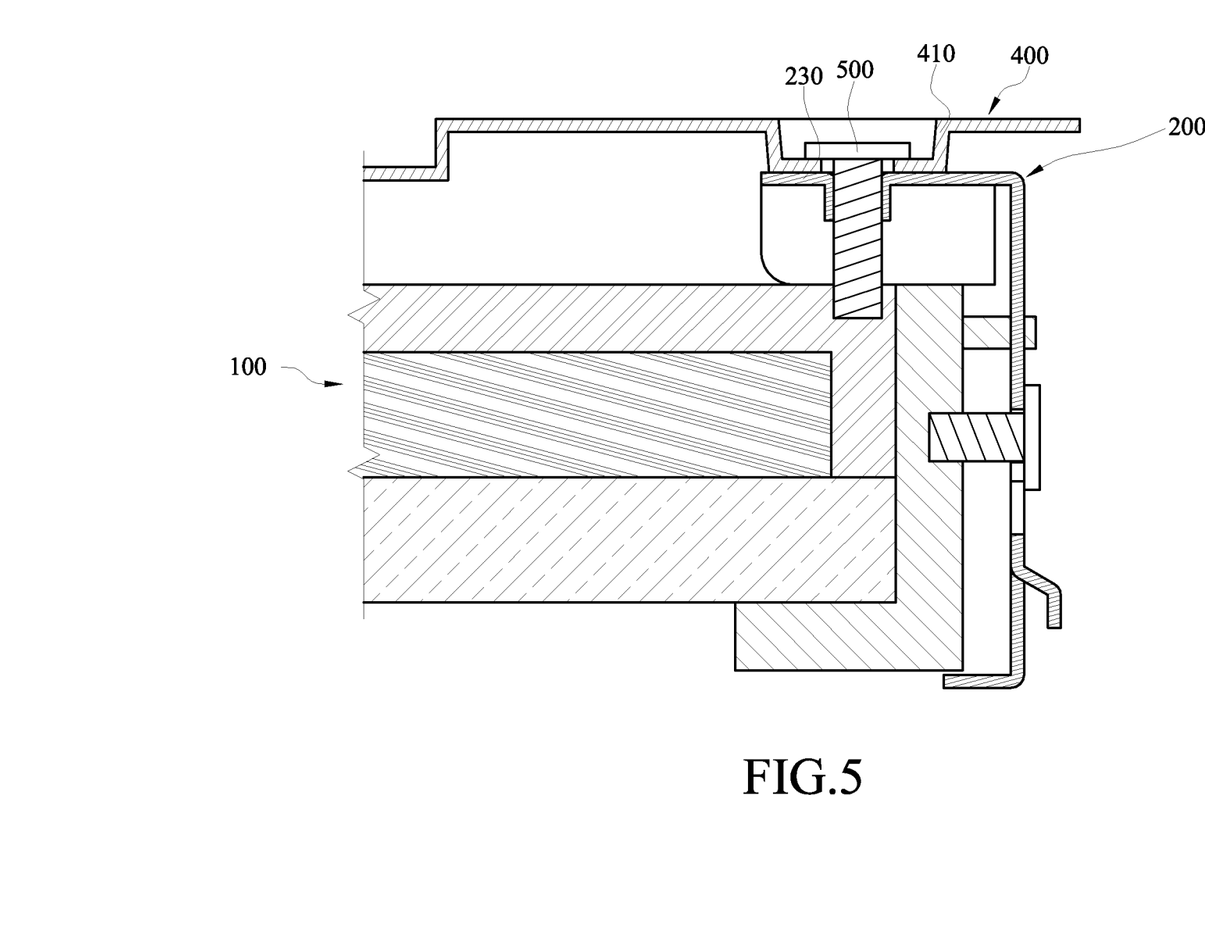
FIG. 5 and FIG. 6 are schematic views illustrating an assembly sequence of FIG. 1.
Figure 6:
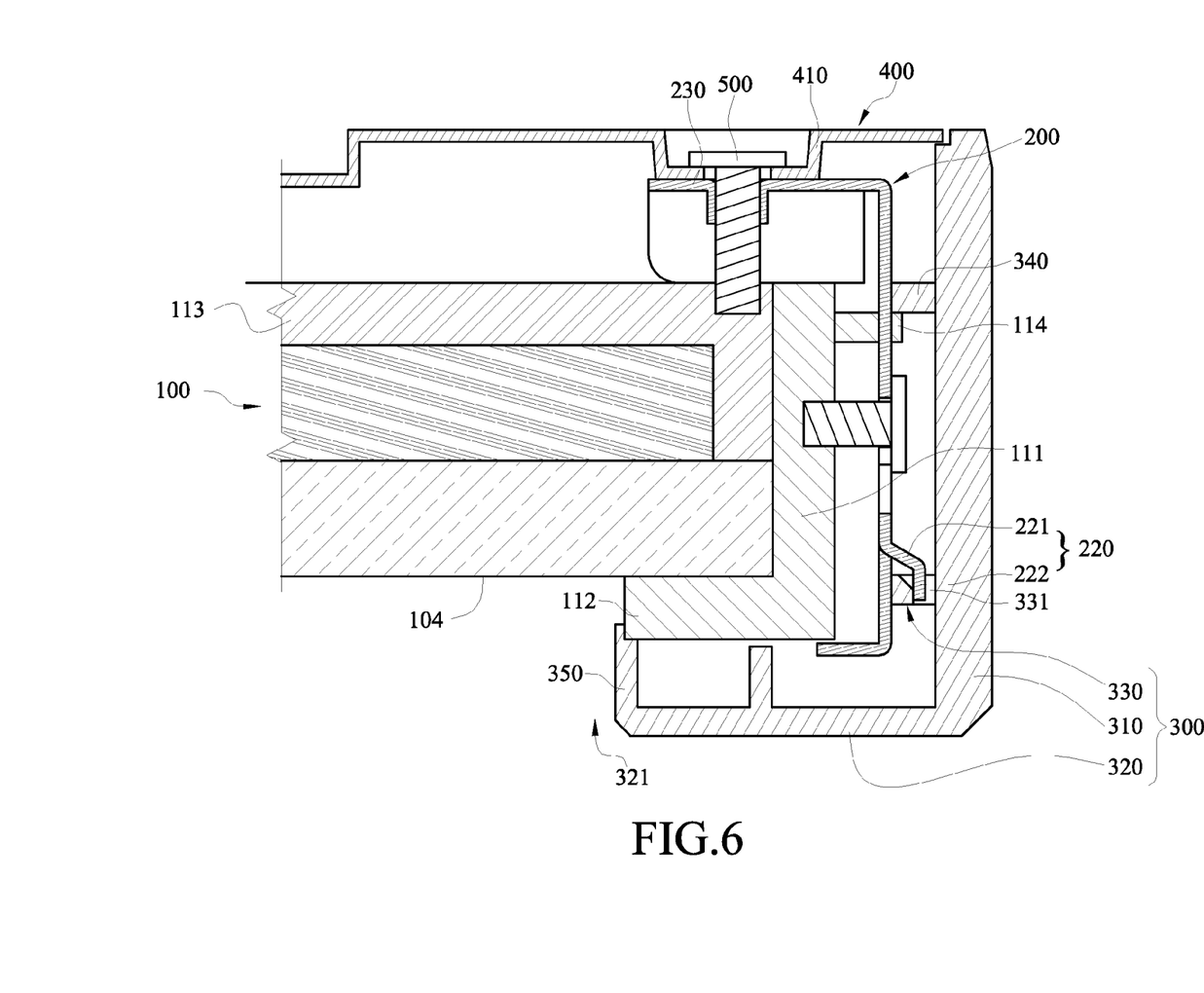

FIG. 5 is a sectional view of the display module 100, the assembly holder 200, and the rear case 400 after being assembled. FIG. 6 is a sectional view of the display module 100, the assembly holder 200, the front case 300, and the rear case 400 after being assembled. Referring to FIG. 6, a distance between the second withstanding portion 330 and the second plate member 320 is less than a distance between the second fastening portion 340 and the second plate member 320. A distance from the third plate member 350 to the first plate member 310 is greater than the width of the second side plate 112.

For further description of the assembly procedure of the display device 10, further refer to FIG. 5 and FIG. 6. FIG. 5 and FIG. 6 are schematic views illustrating an assembly sequence of FIG. 1. First, as shown in FIG. 5, the locking member 500 runs through the first fixing portion 410 of the rear case 400 and the second fixing portion 230 of the assembly holder 200, so that the rear case 400 is locked at the display module 100. Then, as shown in FIG. 6, the front case 300 is assembled on the back plate 113 of the display module 100. Specifically, the first fastening portion 114 is buckled on the second fastening portion 340, and the withstanding section 222 of the first withstanding portion 220 is inserted in the groove 331 of the second withstanding portion 330, so that the first plate member 310 covers the first side plate 111. The second plate member 320 covers the second side plate 112. The opening 321 exposes the display area 104. The second side plate 112 is located between the first plate member 310 and the third plate member 350, and the display module 100 is located between the rear case 400 and the second plate member 320. However, the disclosure is not limited to the assembly sequence of this embodiment. In some embodiments, the front case 300 is assembled before the rear case 400 is assembled.

Figure 7:
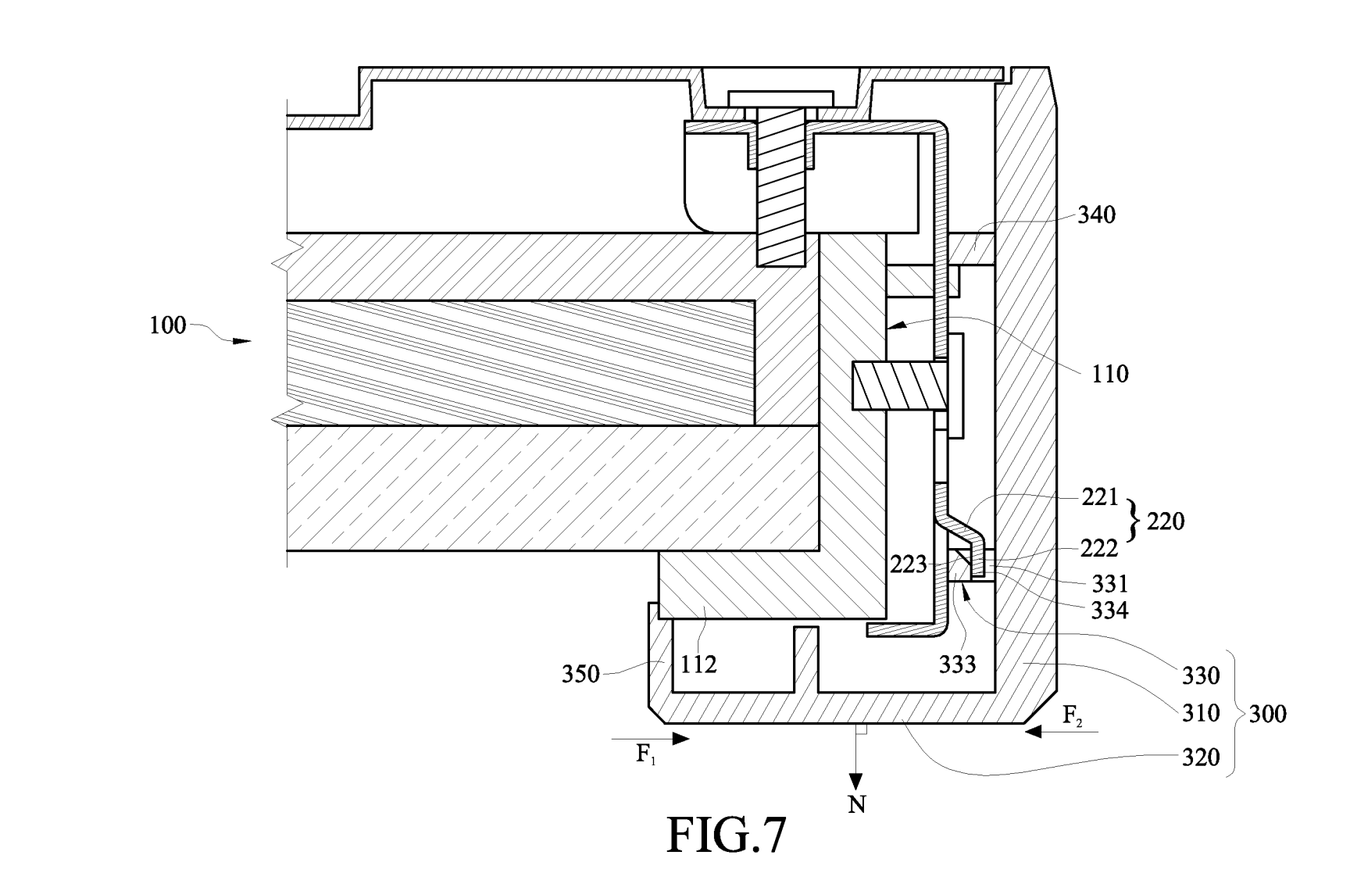
FIG. 7 is a sectional view taken along a section line BB in FIG. 1.

Referring to FIG. 7, FIG. 7 is a sectional view taken along a section line BB in FIG. 1. According to the aforementioned structure configuration, when the front case 300 is squeezed by the display module 100 or is deformed due to the assembly tolerance of the components of the display device 10, the second plate member 320, which is away from the second fastening portion 340, is likely to be deformed under the effect of the an outward deformation force F1. However, in this embodiment, because the second withstanding portion 330 is closer to the second plate member 320 than the second fastening portion 340, when the first adjoining face 223 of the first withstanding portion 220 abuts against the second adjoining face 334 of the second withstanding portion 330 and generates a reacting force F2 resisting the deformation force F1, the reacting force F2 offsets the deformation force F1, thereby reducing the deformation of the second plate member 320. The assembly reliability between the front case 300 and the outer frame 110 is improved, hence avoiding exposing the outer frame 110 inside the display device 10 and avoiding affecting the aesthetic design of the display device 10.

Figure 8:
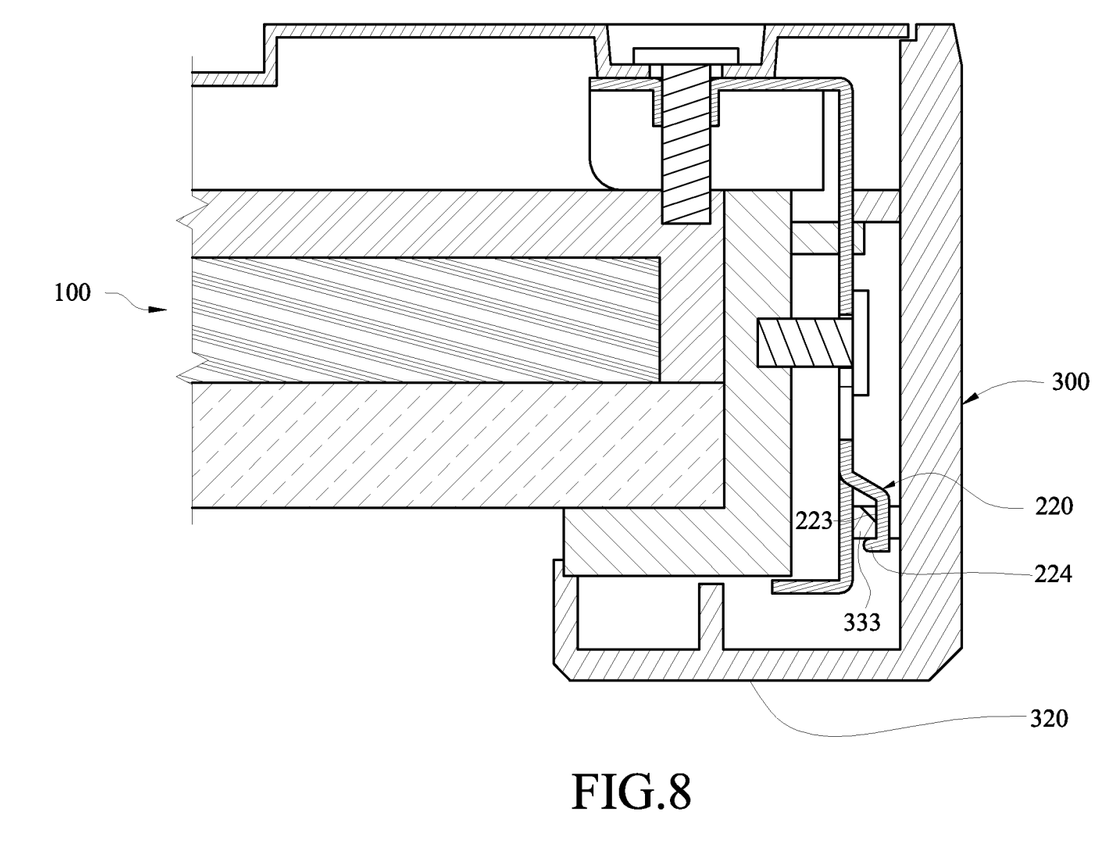
FIG. 8 is a sectional view of a display device according to a second embodiment of the disclosure.

Then, referring to FIG. 8, FIG. 8 is a sectional view of a display device according to a second embodiment of the disclosure. This embodiment is similar to the embodiment of FIG. 1, so only the difference is described herein.

To further improve the assembly reliability between the front case 300 and the outer frame 110 of the display module 100, the first withstanding portion 220 further comprises a rib 224. The rib 224 is located at a side, close to the second plate member 320, of the first adjoining face 223, so that when the front case 300 is assembled on the outer frame 110, the rib 224 abuts against a side surface, close to second plate member 320, of the prop section 333, thereby improving the assembly reliability between the front case 300 and the outer frame 110.

According to the display device of the disclosure, a first withstanding portion is additionally disposed on the assembly holder, and the first withstanding portion is closer to the second plate member than the first fastening portion. Therefore, while withstanding against the second withstanding portion, the first withstanding portion is capable of providing a reacting force that resists a deformation force so as to reduce the deformation of the second plate member. Hence, the assembly reliability between the front case and the outer frame is improved, thereby avoiding exposing the outer frame inside the display device and avoiding affecting the aesthetic design of the display device.

In the embodiment of the disclosure, the first withstanding portion 220 and the second withstanding portion 330 each have an inner surface parallel to the side surface 103 of the display module 100, and abut against each other through the inner surfaces of the first withstanding portion 220 and the second withstanding portion 330. However, in the disclosure, the means for achieving the withstanding function between components is not limited to the structure of parallel inner surfaces. In some embodiments, two arc-shaped, hook-shaped or other withstanding portions capable of enabling the components to abut against each other along a direction perpendicular to the side surface 103 are used.

What is claimed is:

1. A display device, comprising:
   a display module having a front surface, a rear surface, a side surface, and a display area, the front surface and the rear surface being located at two opposite sides of the display module, the side surface being located between the front surface and the rear surface, the display area being located at the front surface;
   an assembly holder comprising a joint portion and a first withstanding portion, the joint portion being arranged on the side surface, the first withstanding portion being connected to the joint portion; and
   a front case comprising a first plate member, a second plate member, and a second withstanding portion, the first plate member being connected to the second plate member, the second withstanding portion being located on the first plate member and having a groove comprising an elongated hole defined by the second withstanding portion and the first plate member, the front case being mounted to the display module, the first plate member covering the side surface, the second plate member covering the front surface and exposing at least a portion of the display area, the first withstanding portion and the second withstanding portion abut against and are fastened to each other in the absence of any screw along a direction perpendicular to the side surface,
   wherein the first withstanding portion comprises a connection section and a withstanding section, the connection section is connected to the joint portion, the withstanding section extends towards the second plate member from the connection section, the second withstanding portion comprises two support sections and a prop section, the two support sections extend towards the side surface from the first plate member, the prop section connects the two support sections, thereby forming the groove, and the withstanding section is located in the groove and abuts against the prop section.

2. The display device according to claim 1, wherein the display module comprises a back plate, an outer frame, and a display panel, the outer frame comprises a first side plate having the side surface and a second side plate having the front surface, two opposite sides of the first side plate are connected to the second side plate and the back plate, the second side plate has an opening, the display panel is disposed between the second side plate and the back plate, and the opening exposes the display area.

3. The display device according to claim 2, wherein the outer frame further comprises a first fastening portion located on an outer wall of the first side plate, the front case further comprises a second fastening portion located on an inner wall of the first plate member, the first fastening portion is fastened to the second fastening portion, so that the front case is fastened to the display module.

4. The display device according to claim 3, wherein both the first fastening portion and the second fastening portion are a bump.

5. The display device according to claim 3, wherein a distance between the first withstanding portion and the second plate member is less than a distance between the first fastening portion and the second plate member.

6. The display device according to claim 2, wherein the front case further comprises a third plate member connected to the second plate member, the first plate member and the third plate member are located at the same side of the second plate member, and a distance from the third plate member to the first plate member is greater than a width of the second side plate.

7. The display device according to claim 1, wherein the withstanding section has a first adjoining face that faces the side surface and keeps a distance from the side surface, the prop section has a second adjoining face that forms the groove and faces the first plate member, and the first adjoining face abuts against the second adjoining face.

8. The display device according to claim 7, wherein the first withstanding portion comprises a rib, the rib is located at a side, close to the second plate member, of the first adjoining face, and the rib abuts against a side, close to the second plate member, of the prop section.

9. The display device according to claim 1, further comprising a rear case and at least one locking member, wherein the rear case further comprises a first fixing portion, the assembly holder further comprises a second fixing portion, the locking member runs through the first fixing portion and the second fixing portion, so that the rear case is mounted to the display module, and the display module is located between the rear case and the second plate member.

* * * * *